Patented Oct. 17, 1950

2,526,534

UNITED STATES PATENT OFFICE 2,526,534

DI-(ARYLOXY)-METHANES

Edgar C. Britton and Ezra Monroe, Midland, and Clare R. Hand, Sanford, Mich., assignors to The Dow Chemical Company, Midland, Mich., a corporation of Delaware No Drawing. Application July 3, 1948, Serial No. 37,058

7 Claims. (Cl. 260—613)

This invention is directed to di-(aryloxy)-methanes having the following formula:

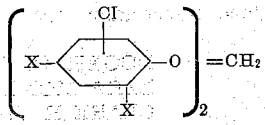

wherein one X is hydrogen and the other X is a lower alkyl radical containing from 1 to 4 carbon atoms, inclusive. Members of this group of compounds have been prepared and found to be useful as insecticides and as intermediates in the preparation of more complex organic derivatives. The compounds are oils or crystalline solids, somewhat soluble in many organic solvents and substantially insoluble in water.

The new compounds may be prepared by reacting an alkali metal phenolate with a methylene halide such as dichloro-methane or dibromo-methane. The sodium phenolates are preferably employed. In carrying out the reaction, equimolecular proportions of sodium hydroxide and the substituted phenol are dissolved in methyl or ethyl alcohol. A one-half molecular proportion of the methylene halide is then added to the mixture and the latter heated under autogenous pressure to a temperature of between 90° and 140° C. for a period of time required to complete the reaction. The reaction mixture is then washed with water, and treated in conventional fashion to recover the product. If desired, the crude reaction product may be purified by fractional distillation under reduced pressure, or in the case of a crystalline solid, by recrystallization from organic solvents.

Example 1

168 grams (4.2 mols) of sodium hydroxide, 570 grams (4 mols) of 4-chloro-2-methyl-phenol, 173.3 grams (2.04 mols) of dichloro-methane and 319 grams of methyl alcohol was heated in a pressure reactor with agitation at 120° to 135° C. for 11 hours. The crude reaction product was washed with water and recrystallized from methylene dichloride to obtain di-(4-chloro-2-methyl-phenoxy)-methane, a crystalline solid having a melting point of 146.5° to 148° C.

Example 2

In a manner similar to that of Example 1, 570 grams (4 mols) of 6-chloro-2-methyl-phenol, 168 grams (4.2 mols) of sodium hydroxide, 173.3 grams (2.04 mols) of dichloro-methane and 319 grams of methyl alcohol were heated in a pressure reactor at a temperature of 112° to 135° C. for 10¼ hours. At the end of this period, the reactor and contents were cooled and the crude reaction mixture discharged into an excess of water. The organic products of reaction were recovered from the water dispersion by extraction with chlorobenzene, and the washed benzene extract fractionally distilled under reduced pressure. From this fractionation was obtained 317 grams of di-(6-chloro-2-methyl-phenoxy)-methane as an oily liquid having a refractive index $n/D$ of 1.5664 at 25° C.

Example 3

Similarly, 2-chloro-4-secondarybutyl-phenol was reacted with dichloro-methane to obtain di-(2-chloro-4-secondarybutyl-phenoxy)-methane, an oily liquid having a refractive index $n/D$ of 1.5479 at 25° C.

Example 4

Di-(4-chloro-2-secondarybutyl-phenoxy)-methane was prepared by reacting 4-chloro-2-secondarybutyl-phenol with dichloro-methane and found to be an oily liquid having a refractive index $n/D$ of 1.5477 at 25° C.

Other compounds which may be similarly prepared include di-(4-chloro-2-methyl-phenoxy)-methane, di-(4-chloro-2-propyl-phenoxy)-methane, di-(6-chloro-2-ethyl-phenoxy)-methane, di-(6-chloro-2-propylphenoxy)-methane, di-(6-chloro-2-butyl-phenoxy)-methane, di-(2-chloro-4-methyl-phenoxy)-methane, di-(2-chloro-4-ethyl-phenoxy)-methane, di-(2-chloro-4-propyl-phenoxy)-methane, di-(3-chloro-4-methyl-phenoxy)-methane, di-(3-chloro-4-ethyl-phenoxy)-methane, di-(3-chloro-4-propyl-phenoxy)-methane, di-(3-chloro-4-butyl-phenoxy)-methane, di-(3-chloro-2-methyl-phenoxy)-methane, di-(3-chloro-2-ethyl-phenoxy)-methane, di-(3-chloro-2-propyl-phenoxy)-methane, di-(3-chloro-2-butyl-phenoxy)-methane, di-(5-chloro-2-methyl-phenoxy)-methane, di-(5-chloro-2-ethyl-phenoxy)-methane, di-(5-chloro-2-propyl-phenoxy)-methane and di-(5-chloro-2-butyl-phenoxy)-methane.

We have found that the new compounds are effective as insecticides and may be employed in the dosages required for insect control with negligible injury to the foliage of plants. In this use the compounds are preferably employed in combination with an inert carrier. They may be dispersed on a finely divided solid and employed as a dust mixture. Such mixture may be suspended in water with the aid of a wetting agent, if desired, and the suspension applied to the plants in the form of a spray. Good results are obtained with suspensions containing from about 0.25 to 3 pounds of the toxicant per 100 gallons of the spray mixture.

A representative composition found valuable for the control of agricultural pests is the following:

| | Parts by weight |
|---|---|
| Di-(6-chloro-2-methyl-phenoxy)-methane | 90 |
| Dioctyl ester of sodium sulfosuccinic acid (Aerosol OT) | 10 |

The foregoing materials were mechanically mixed and the product subsequently dispersed in water to produce a spray containing 3 pounds of the toxicant per 100 gallons. When this composition was applied against bean aphids on nasturtium plants and 2-spotted spider mites on cranberry bean plants a 100 per cent kill of the test organisms was obtained.

We claim:

1. A di-(aryloxy)-methane having the following formula:

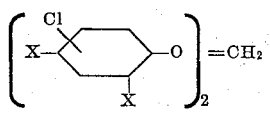

wherein one X is hydrogen and the other X is a lower alkyl radical containing from 1 to 4 carbon atoms, inclusive.

2. A di-(aryloxy)-methane having the following formula:

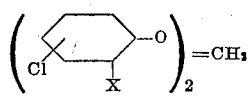

wherein X is a lower alkyl radical containing from 1 to 4 carbon atoms, inclusive.

3. A di-(aryloxy)-methane having the following formula:

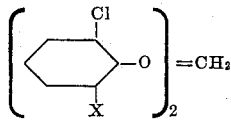

wherein X is a lower alkyl radical containing from 1 to 4 carbon atoms, inclusive.

4. A di-(aryloxy)-methane having the following formula:

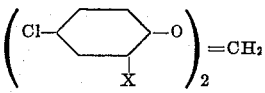

wherein X is a lower alkyl radical containing from 1 to 4 carbon atoms, inclusive.

5. Di-(6-chloro-2-methyl-phenoxy)-methane.
6. Di-(4-chloro-2-secondarybutyl-phenoxy)-methane.
7. Di-(2-chloro-4-secondarybutyl-phenoxy)-methane.

EDGAR C. BRITTON.
EZRA MONROE.
CLARE R. HAND.

REFERENCES CITED

The following references are of record in the file of this patent:

UNITED STATES PATENTS

| Number | Name | Date |
|---|---|---|
| 2,130,990 | Coleman et al. | Sept. 20, 1938 |
| 2,291,528 | Bruson et al. | July 28, 1942 |
| 2,330,234 | Moyle | Sept. 28, 1943 |